US012768446B2

(12) United States Patent
Lampaert et al.

(10) Patent No.: US 12,768,446 B2
(45) Date of Patent: Oct. 20, 2026

(54) SEAL FOR A PROPULSION ASSEMBLY

(71) Applicants: SAFRAN NACELLES, Gonfreville-l'Orcher (FR); SAFRAN AIRCRAFT ENGINES, Paris (FR)

(72) Inventors: Charles-Antoine Lampaert, Moissy-Cramayel (FR); Jocelin Fosse, Moissy-Cramayel (FR); Simon Verger, Moissy-Cramayel (FR); Bruno Alexandre Didier Jacon, Moissy-Cramayel (FR)

(73) Assignees: SAFRAN NACELLES, Gonfreville-l'Orcher (FR); SAFRAN AIRCRAFT ENGINES, Paris (FR)

( * ) Notice: Subject to any disclaimer, the term of this patent is extended or adjusted under 35 U.S.C. 154(b) by 245 days.

(21) Appl. No.: 18/705,179

(22) PCT Filed: Oct. 26, 2022

(86) PCT No.: PCT/FR2022/052032
§ 371 (c)(1),
(2) Date: Apr. 26, 2024

(87) PCT Pub. No.: WO2023/073318
PCT Pub. Date: May 4, 2023

(65) Prior Publication Data

US 2026/0132851 A1 May 14, 2026

(30) Foreign Application Priority Data

Oct. 27, 2021 (FR) ...................................... 2111423

(51) Int. Cl.
*F16J 15/02* (2006.01)

(52) U.S. Cl.
CPC .................................. *F16J 15/027* (2013.01)

(58) Field of Classification Search
CPC ...................................................... F16J 15/027
(Continued)

(56) References Cited

U.S. PATENT DOCUMENTS 2,654,922 A 10/1953 Krupp
4,470,608 A * 9/1984 Warren .................. F16J 15/024 277/645
(Continued)

FOREIGN PATENT DOCUMENTS

EP 3632799 A1 4/2020
FR 2914957 A1 10/2008
(Continued)

OTHER PUBLICATIONS

English Translation of the International Search Report for International Application No. PCT/FR2022/052032, issued Dec. 13, 2022 (2 pages).
(Continued)

*Primary Examiner* — Nathan Cumar
(74) *Attorney, Agent, or Firm* — Bookoff McAndrews, PLLC

(57) ABSTRACT

A seal configured to be interposed between a first and a second element of a propulsion assembly in an assembled configuration, the seal having a segment with an irregular reinforcement extending over at least a part of the length of the seal and which has a contour comprising a first contour part provided with a first reinforcement part, and a second contour part in which said first reinforcement part is absent, such that the second contour part has an increased susceptibility to buckling by comparison with the first contour part.

11 Claims, 7 Drawing Sheets

(58) Field of Classification Search
USPC .......................................................... 277/645
See application file for complete search history.

(56) References Cited

U.S. PATENT DOCUMENTS

| | | | | | |
|---|---|---|---|---|---|
| 5,251,917 | A * | 10/1993 | Chee | B64D 27/00 428/920 |
| 8,556,270 | B2 * | 10/2013 | Toth | F16J 15/3268 277/559 |
| 2011/0024994 | A1 | 2/2011 | Bunel | |
| 2014/0262358 | A1 * | 9/2014 | Livingston | B64D 27/00 169/48 |
| 2015/0266561 | A1 * | 9/2015 | Hariram | B64C 1/066 49/506 |
| 2017/0321804 | A1 * | 11/2017 | Soman | F16J 15/122 |
| 2018/0156051 | A1 * | 6/2018 | Strutt | F01D 11/003 |
| 2019/0338662 | A1 | 11/2019 | Ratajac | |
| 2020/0173299 | A1 * | 6/2020 | Barker | F01D 11/125 |
| 2021/0129462 | A1 * | 5/2021 | Rolland | B29C 70/443 |
| 2021/0170445 | A1 * | 6/2021 | Grove | C09D 175/02 |

FOREIGN PATENT DOCUMENTS

| | | | |
|---|---|---|---|
| FR | 2920215 | A1 | 2/2009 |
| GB | 2172347 | A | 9/1986 |
| WO | 2017216468 | A1 | 12/2017 |

OTHER PUBLICATIONS

Search Report issued in French Application No. 2111423, mailed Jul. 23, 2022 (6 pages).

* cited by examiner

[Fig. 1]
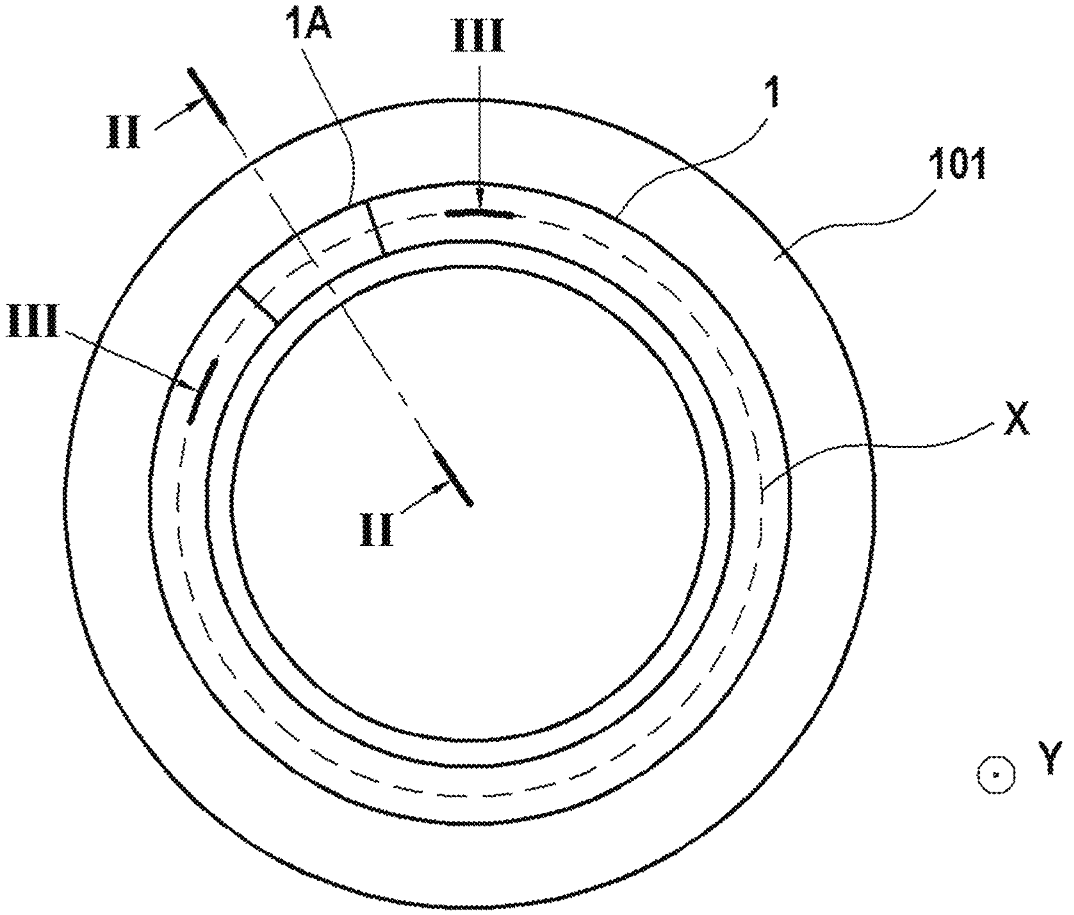
[Fig.2]
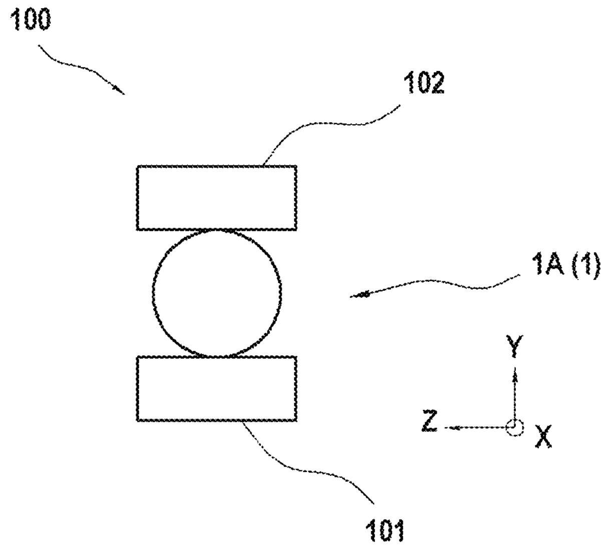

[Fig.3A]
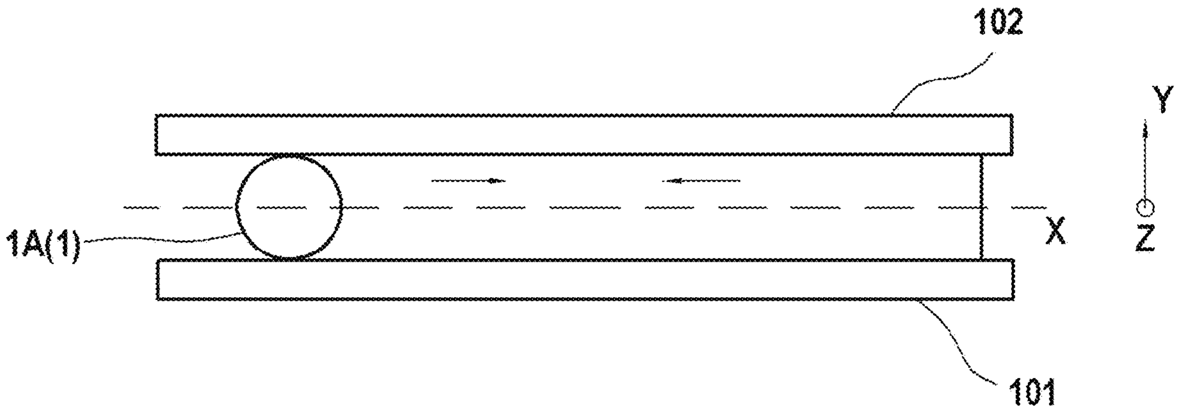
[Fig.3B]
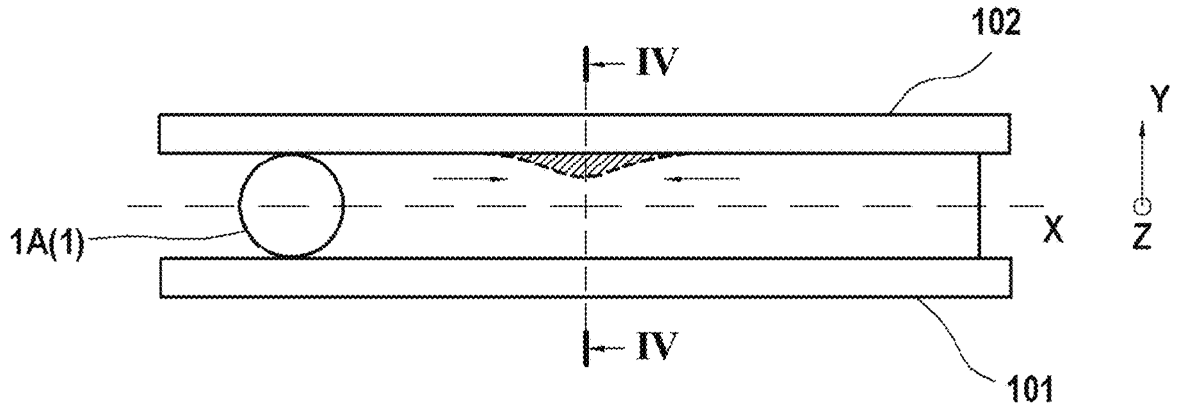

[Fig.4A]
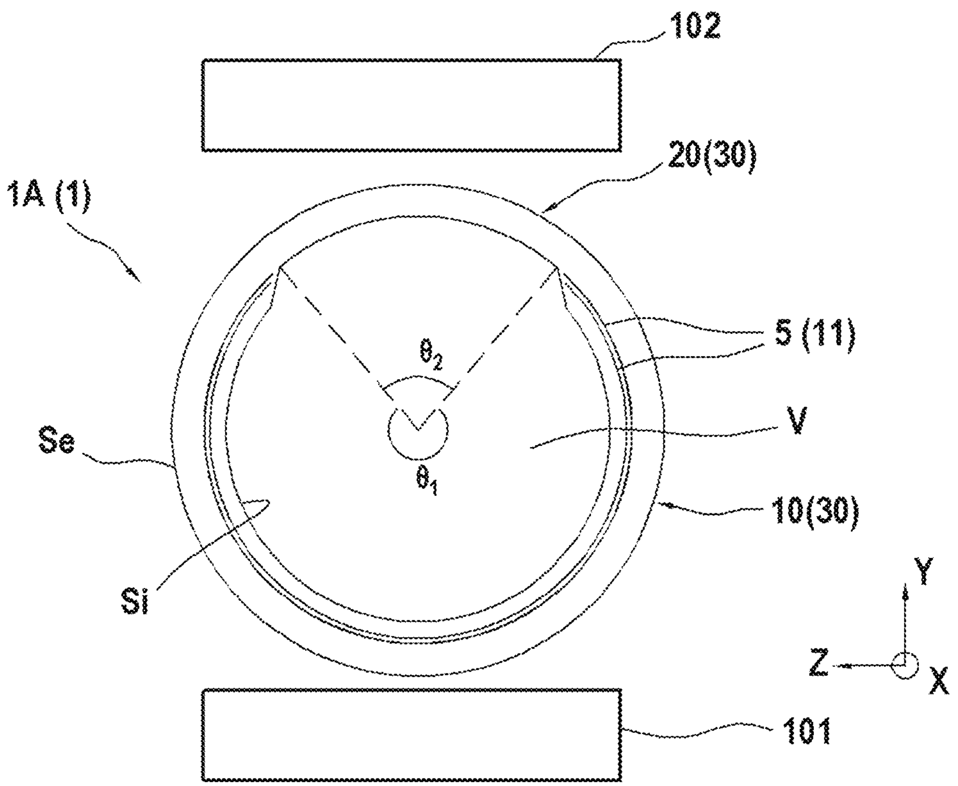
[Fig.4B]
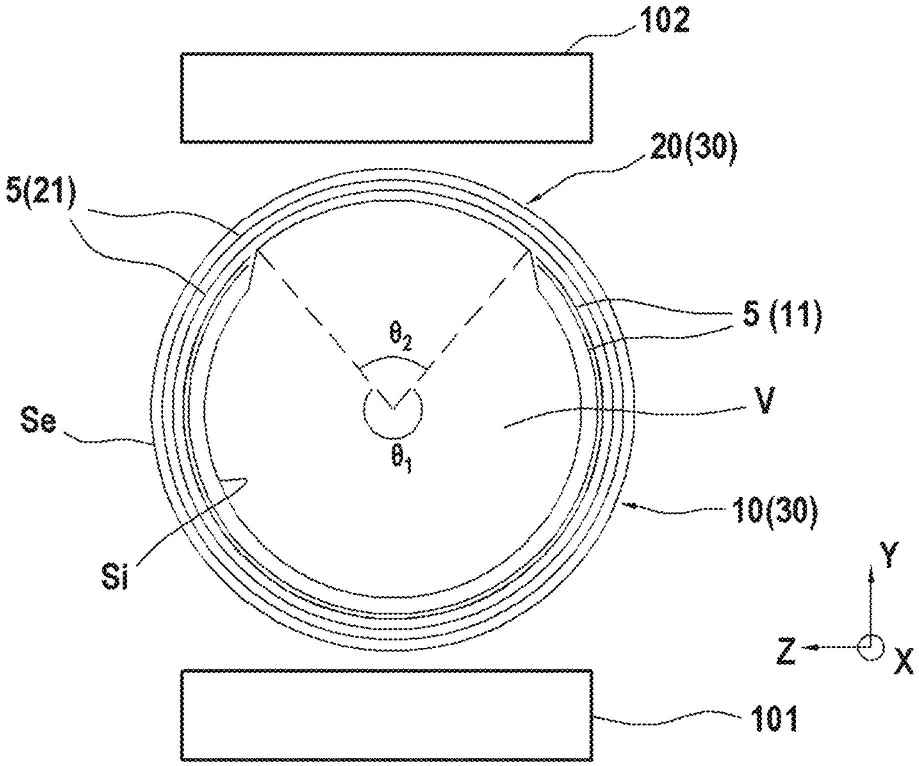

[Fig.4C]
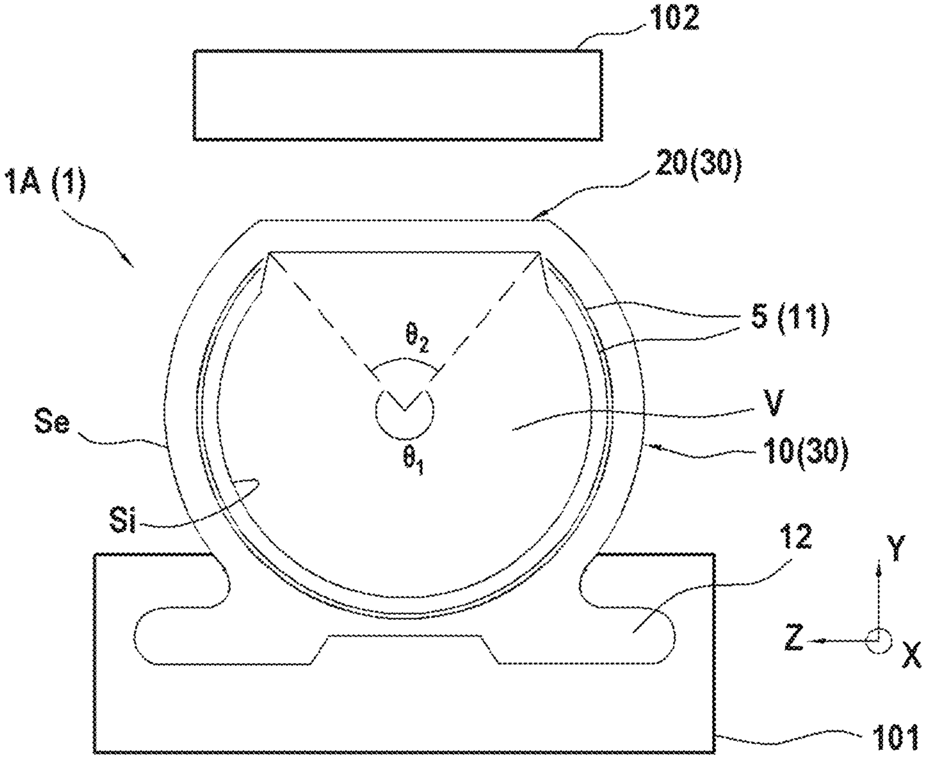
[Fig.4D]
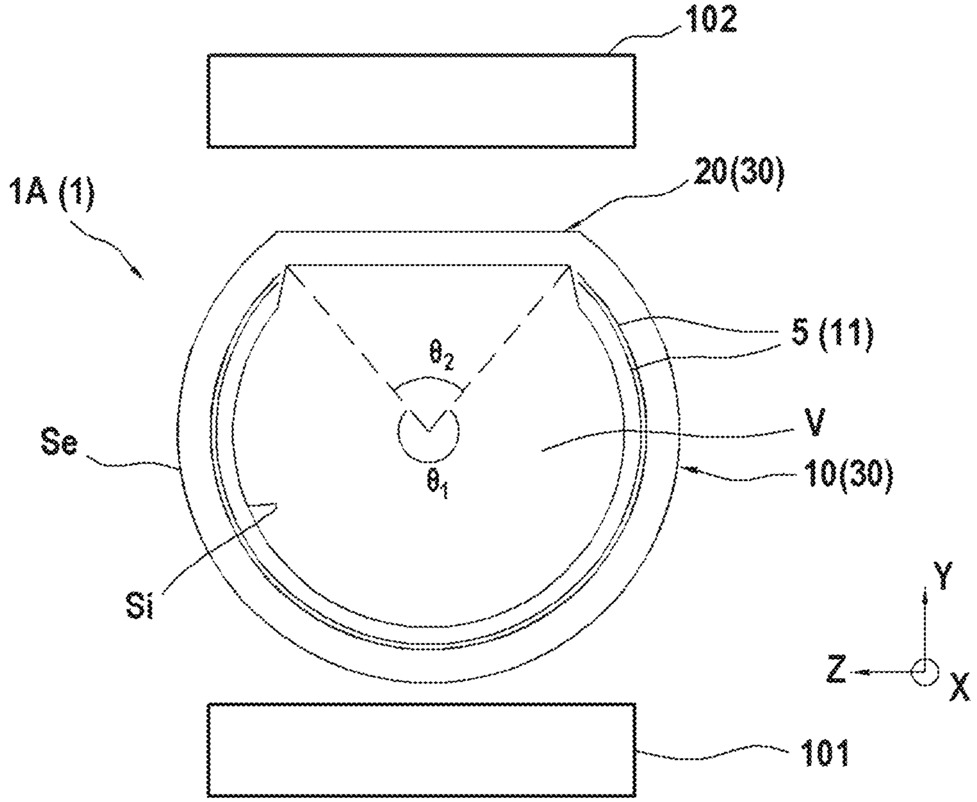

[Fig.4E]
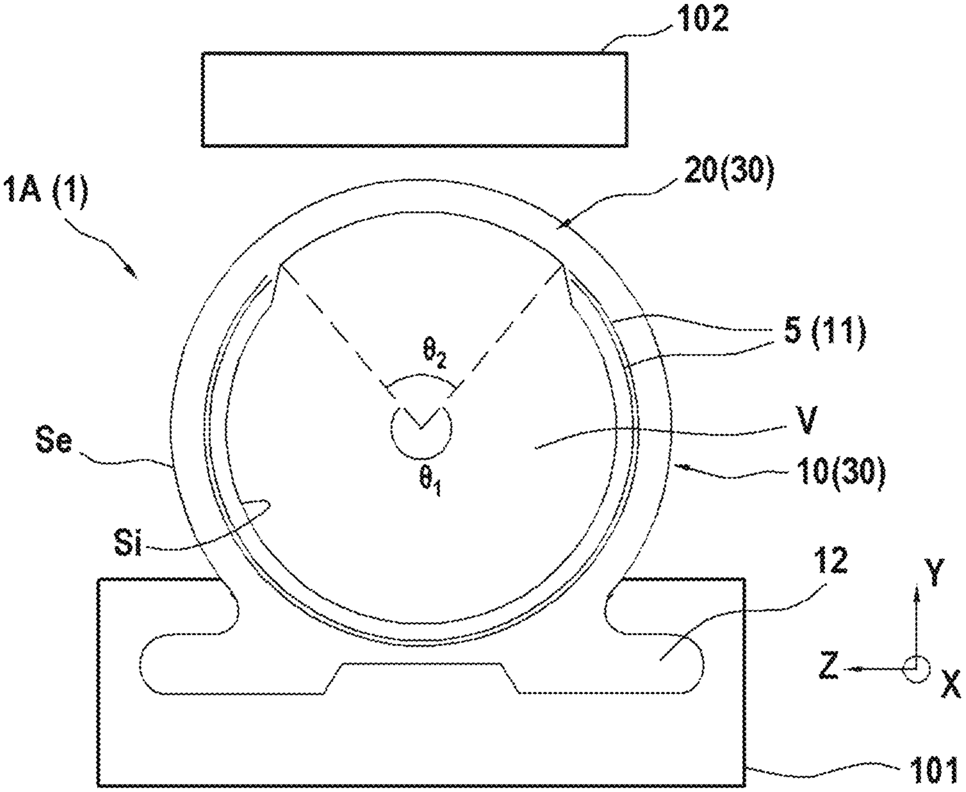

[Fig.5A]
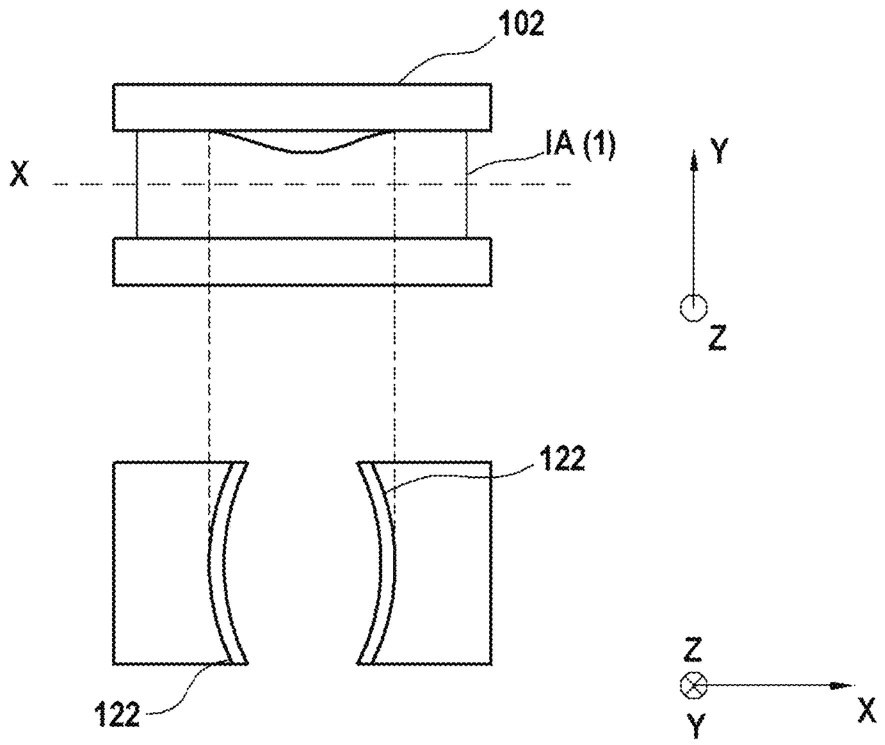
[Fig.5B]
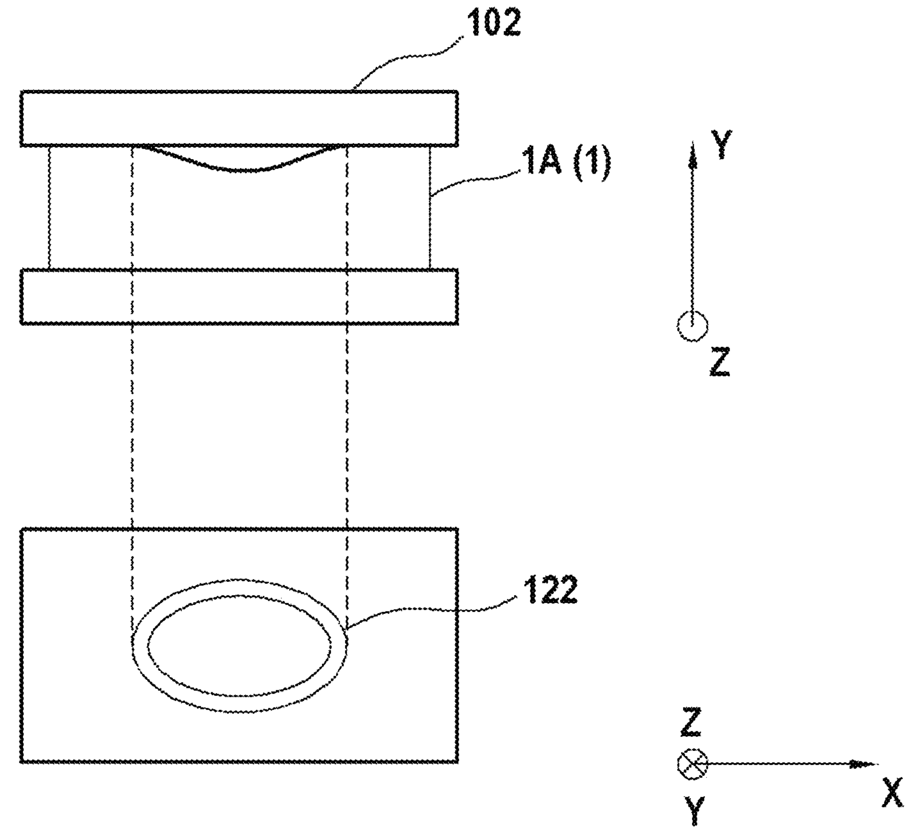

[Fig. 6]
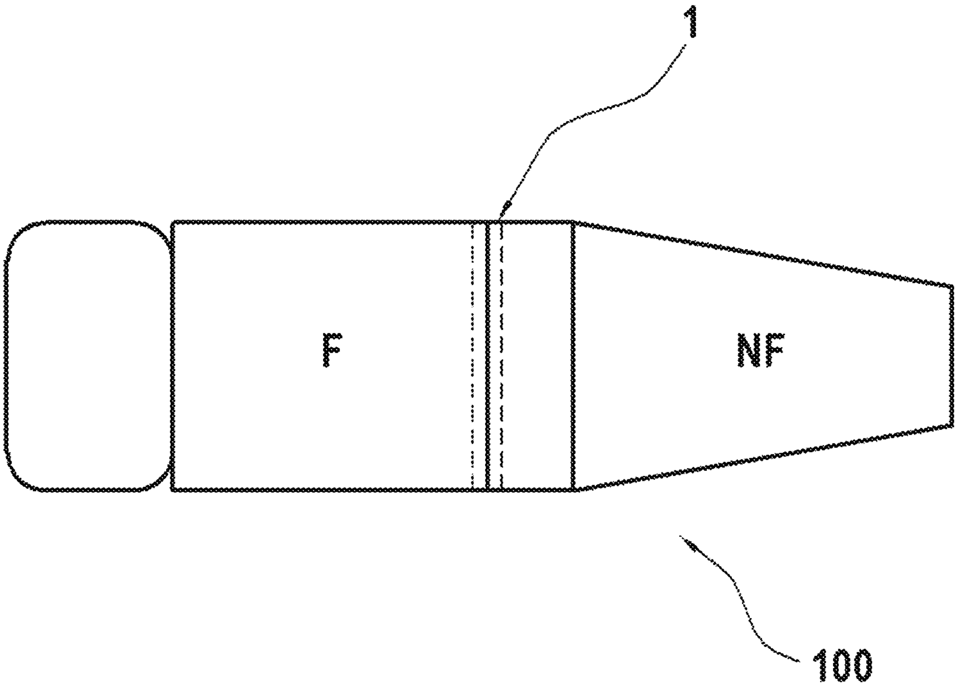

SEAL FOR A PROPULSION ASSEMBLY

CROSS-REFERENCE TO RELATED APPLICATION(S)

This is a National Stage Application under 35 U.S.C. § 371 of International Application No. PCT/FR2022/052032, filed Oct. 26, 2022, which claims priority to French Patent Application No. 2111423, filed on Oct. 27, 2021.

TECHNICAL FIELD

This summary relates to a seal for a propulsion assembly, and more specifically a fire and fluid seal for a propulsion assembly. The propulsion assembly is in particular of the type used for aircraft propulsion. It is more specifically an assembly comprising a turbojet engine and a nacelle.

PRIOR ART

The need to ensure sealing between different compartments of a propulsion assembly is known.

The French patent application FR2920215 describes an example of a seal intended to be interposed between a turbojet engine and a nacelle of an aircraft.

In particular, there is a need to ensure so-called "fire and fluid" sealing between a fire compartment (fire area) and another non-fire compartment (non-fire area).

A fire compartment is a propulsion assembly which is designed to resist and/or contain the flames in the event of a fire in this fire compartment.

A fire can for example occur if there is a malfunction of a part of the propulsion assembly, causing a release of fluid and/or flammable gas. Such a malfunction can for example take place in a fuel duct allowing highly flammable fuel to escape and then run the risk of catching fire in contact with a heat source, of the kind that may exist near the engine of the propulsion assembly.

A "non-fire" compartment is a compartment of a propulsion assembly which is designed to receive a fluid and is not covered by the definition of the fire compartment. For example, the fluid can be air or a mixture of gases resulting from combustion.

In certain circumstances, which will be described in more detail in relation to FIGS. 3A and 3B, forces generated by the compression of the seal cause walls of the seal to buckle, such that the contact of the seal with the walls separating the compartments to be sealed off is no longer ensured.

SUMMARY OF THE INVENTION

In this context, it would be desirable to possess a solution for preventing the loss of contact and sealing associated with buckling of the seal walls.

This disclosure relates to a seal configured to be interposed between a first and a second element of a propulsion assembly in an assembled configuration; the seal having a segment with an irregular reinforcement extending over at least a part of the length of the seal and which has a transverse contour comprising a first contour part provided with a first reinforcement part, and a second contour part in which said first reinforcement part is absent, such that the second contour part has an increased susceptibility to buckling by comparison with the first contour part.

The term "interposed" is understood to mean put in contact with the elements under consideration. In particular, the term "assembled configuration" is understood to mean a configuration in which the seal is put in contact between the first and the second element of a propulsion assembly and clamping forces exerted on the seal in such a way as to fulfil the sealing function.

The term "contact between two parts" is understood to mean direct contact between these two parts or contact between said two parts with a part interposed between said two parts.

In the assembled configuration, the seal, the first and the second element of the propulsion assembly are aligned along an axis, which will be referred to as the axis of alignment. The axis of alignment also refers to the direction of the clamping forces applied by the first element and the second element on the seal.

The seal has a main direction corresponding to the main direction of extension of the seal, along which the length of the seal is measured. If the seal is not straight, the main direction is curved.

The term "transverse" should be understood to mean a direction perpendicular to the main direction. The axis of alignment is perpendicular to the main direction.

The term "segment" should be understood to mean a portion of the seal along the main direction of the seal. The term "segment" will hereinafter refer to a continuous portion of the seal. However, it will be understood that "segment" may also refer to a discontinuous portion of the seal along the main direction of the seal. The segment can also refer to the entire seal, in which case the segment extends over the entire length of the seal.

The term "transverse contour" should be understood to mean an outer wall of the seal, extending in a transverse plane around the main direction and extending along the main direction.

The term "buckling" should be understood to mean a mechanical instability of a panel or a shell, associated with the appearance of large deformations of a panel or a shell for a slight increase in a load in the median plane of the panel or shell.

A shell is a solid delimited by two near and substantially parallel surfaces, the dimensions of the surfaces being large compared to the separation between the two surfaces. If the surfaces are plane and parallel, this solid is referred to by the term "panel". Hereinafter, unless otherwise mentioned, the features described in relation a shell are also applicable to a panel. Hereinafter, the shells under consideration are the transverse contour, and in particular the first contour part and the second contour part.

The susceptibility of a shell to buckling is understood in relation to the critical stress causing the buckling of the shell. In other words, the more liable a shell is to buckling, the lower the critical stress causing the buckling of the shell. In this case, a greater susceptibility to buckling of a wall of the seal refers to a tendency of the seal to buckle locally at said wall in response to a load while another wall less liable to buckling will not have a tendency to buckle.

In such a seal, the second contour part has a greater tendency to buckle than other contours parts of the segment under consideration. Thus, the local extension of the buckling phenomenon can be controlled in such a way as to affect only the second contour part. Thus, despite the deformation affecting the second contour part, contact with the second element of the propulsion assembly can be maintained continuously, i.e. with no discontinuity of contact, and the sealing function fulfilled.

In certain embodiments, the seal is configured so that in the assembled configuration the first contour part comes into contact with the first element of said propulsion assembly and so that the second contour part comes into contact with the second element of said propulsion assembly.

In certain embodiments, the seal has a hollow transverse shape.

Such a seal is more sensitive to buckling than a seal having a solid cross-section, and is therefore particularly suitable for the solution of this invention.

In certain embodiments, the first contour part extends in an arc, the length of which is between 55% and 95%, preferably between 65% and 70%, preferably 67% of the length of the transverse contour of the seal.

In certain embodiments, the first transverse contour part extends in an arc formed over an angle between 200° and 340°, preferably an angle between 230° and 250°, preferably an angle of 240°.

The angle is preferably a central angle. For example, if the cross-section of the seal comprises an arc of a circle or of an ellipse, the center is the center of the arc of a circle or of an ellipse. In general, if the cross-section is of any shape whatsoever, the center can be the center of the minimum circle of the cross-section of the seal, i.e. the center of the smallest circle containing the cross-section of the seal. In other words, the minimum circle is the smallest circle in which the cross-section of the seal can be contained, such that the cross-section of the seal is entirely contained in the minimum circle and tangent to a periphery of the cross-section.

Such an extension of the first contour part makes it possible to reduce the extension of the second contour part to a wall, the buckling of which does not cause the total loss of contact between the second contour part and the second element of the propulsion assembly.

Due to the buckling of the second contour part, the contact with the second element of the propulsion assembly can also be made by the first contour part.

In certain embodiments, the seal comprises a second reinforcement part formed on the first contour part and the second contour part.

The second reinforcement part improves the mechanical behavior and/or tightness of the seal.

In certain embodiments, the second reinforcement part is formed between the first reinforcement part and an outer surface of the seal. In other words, the second reinforcement part is located radially outward of the first reinforcement part.

Such a structure offers easier assembly of the seal reinforcement parts.

In certain embodiments, one from among the first reinforcement part and the second reinforcement part comprises at least one layer of reinforcement material housed in a matrix. The term "layer" should be understood to mean a ply of the reinforcement material.

In certain embodiments, the at least one from among the first reinforcement part and the second reinforcement part comprises at least two reinforcement layers formed into superimposed layers. Preferably, the at least two reinforcement layers are independent.

In certain embodiments, the matrix comprises an elastomer, for example silicone.

The silicone makes it possible to ensure fluid-tightness, and offers a certain amount of resistance to high temperatures, and its mechanical behavior is weakly dependent on temperature.

In certain embodiments, the at least one reinforcement material layer comprises a material from among glass fabrics, carbon fabrics and aramid fabrics, boron fabrics and more generally ceramic fabrics.

Such materials are used to fulfil a function of structural reinforcement of the seal and the fire tightness.

In certain embodiments, the first and second contour parts have different curvatures, the second contour part optionally having a flat area.

Such a structure makes it possible to adapt the buckling deformation mode of the second contour part, and thus to adapt the contact with the second element of the propulsion assembly.

In certain embodiments, the seal has a connecting shoe located on the side of the first contour part, preferably adjacent to the first contour part.

The connecting shoe makes it possible to ensure the attachment of the seal to the first element of the propulsion assembly, and thus ensure the correct orientation, and therefore the correct contact, of the seal with the second contour part. The connecting shoe can moreover improve the buckling resistance at the shoe.

In certain embodiments, the shoe is devoid of reinforcement. The term "devoid of reinforcement" should be understood to mean, for example, devoid of the reinforcements of the first reinforcement part and/or of the second reinforcement part.

This summary also relates to a propulsion assembly comprising a first and a second propulsion assembly element and a seal according to the invention.

In certain embodiments, the segment with the irregular reinforcement extends at the most over 80%, preferably 50%, preferably 20% of the length of the seal, optionally in a single segment.

In certain embodiments, the shoe is provided mounted in the first propulsion assembly element.

Such an assembly makes it possible to ensure the retainment of the seal against the first propulsion assembly element and a sealed contact between the first propulsion assembly element and the seal.

In certain embodiments, the second reinforcement part is in contact with the second propulsion assembly element. Preferably, the second contact part exerts a pressure against the second element.

Such an assembly makes it possible to ensure a sealed contact between the seal and the second propulsion assembly element.

BRIEF DESCRIPTION OF THE DRAWINGS

FIG. 1 is a schematic view of a seal in accordance with the invention mounted against a first element of a propulsion assembly.

FIG. 2 is a schematic section view along the section plane II of FIG. 1 of a seal in accordance with the invention interposed between a first and a second element of a propulsion assembly.

FIG. 3A FIG. 3B FIGS. 3A and 3B are two schematic section views along the section III of FIG. 1 of a seal in accordance with the invention interposed between a first and a second element of a propulsion assembly illustrating the buckling of the seal.

FIG. 4A is a section view along the section plane of FIG. 3B of a seal according to an embodiment of the invention.

FIG. 4B FIG. 4C FIG. 4D FIG. 4E FIGS. 4B, 4C, 4D and 4E show alternatives to the embodiments of the seal of FIG. 4A.

FIG. 5A shows a schematic view of an area of contact between a seal exhibiting uncontrolled buckling and a second propulsion assembly element.

FIG. 5B shows a schematic view of an area of contact between a seal in accordance with the invention and exhibiting controlled buckling and a second propulsion assembly element.

FIG. 6 shows an example of a propulsion assembly comprising a seal in accordance with the invention.

DESCRIPTION OF THE EMBODIMENTS

This invention will be described with reference to specific exemplary embodiments, and it is obvious that modifications and changes can be made to these examples without departing from the general scope of the invention as defined by the claims. In particular, individual features of the different embodiments illustrated/mentioned can be combined into additional embodiments. Consequently, the description and drawings must be considered in an illustrative sense rather than a restrictive one.

FIG. 1 shows a seal 1 (hereinafter, attached) according to the invention, mounted against a first element 101 of a propulsion assembly 100 (hereinafter, first element 101). FIG. 6 shows a propulsion assembly 100 comprising a seal 1, positioned between a fire area F and a non-fire area NF.

The seal 1 shown is a circular seal, the length of which is consequently measured along the circumference of the circle it describes. It will be understood that the features that will be described hereinafter are also applicable for a seal of various shapes and sections. The seal can have any shape corresponding to the shape of the surface to be sealed, and in particular have segments with a significant curvature or irregularities in shape. Such segments are liable to cause a concentration of stresses associated with the appearance of buckling.

A propulsion assembly 100 comprises a nacelle and an aircraft turbomachine.

In particular, as shown in the view of FIG. 2 along the section plane II of FIG. 1, provision is made for the seal 1 to be interposed between the first element 101 of the propulsion assembly 100 (hereinafter, first element) and a second element 102 of the propulsion assembly 100 (hereinafter, second element) in such a way as to make a fire-fluid seal between a fire compartment and a non-fire compartment of a propulsion assembly 100.

For example, in FIGS. 1 and 6, a fire compartment at the seal 1 is separated from a non-fire compartment at the seal 1 by way of the seal 1 mounted between the first element 101 of the propulsion assembly 100 and the second element 102 of a propulsion assembly 100.

It will be understood that the seal can be of variable shape, and can have a non-closed shape, for example an arc of a circle or more generally a non-closed curve viewed in the plane of FIG. 1.

The seal 1 extends mainly along a main direction X, corresponding to a direction along which the length of the seal is measured, and to a direction along which the length of the surfaces to be sealed is measured. In this case, the main direction X is the circumference of the circle described by the seal 1.

In the schematic representation of FIG. 2, the seal 1 is shown in the assembled configuration, i.e. mounted between the first element 101 and the second element 102. The first element 101, the second element 102 and the seal are thus aligned along a direction corresponding to an axis of alignment Y. The axis of alignment Y is perpendicular to the main direction X.

Note that the assembled configuration is associated with the application of clamping forces exerted by the first element 101 and the second element 102 on the seal 1. These clamping forces are exerted along the axis of alignment Y.

Finally, a third axis Z is defined, perpendicular to the main direction X and to the axis of alignment Y.

The phenomenon of panel buckling will now be described in relation to FIGS. 3A and 3B.

FIGS. 3A and 3B show schematic views along the section III of FIG. 1 of a segment 1A of a seal liable to buckling, in the assembled configuration.

For various reasons, for example related to a significant curvature of the seal 1 in its extension along the main direction X, a change in concavity of the extension of the seal 1 along the main direction X, or the nature of the clamping forces, compressive forces may arise at a point on the seal 1, illustrated by the arrows of FIG. 3A.

These compressive forces may cause a local exceeding of a critical buckling stress, which can cause buckling and local loss of contact and therefore sealing. An area of loss of contact associated with buckling is shown hatched in FIG. 3B. This loss of sealing can cause a loss of performance and/or a rise in power consumption of the turbomachine, or even an irreversible degradation of the turbomachine.

FIG. 5A shows a schematic view similar to that of FIG. 3B, and which schematically represents the area of contact 122 between the seal 1 and the second element 102, in the scenario where the joint has uncontrolled buckling. At a distance from the central area of FIG. 5A, the seal generally has a dual contact with the second element 102 along the axis Z due to the squashing of the seal 1 caused by the clamping force, the dual contact being continuous along the main direction X. However, due to the buckling, the area of contact 122 is interrupted along the main direction X, which corresponds to a loss of contact and therefore of sealing.

This invention proposes to replace such a segment 1A having a high susceptibility to loss of sealing with a segment 1A having irregular reinforcements, i.e. reinforcements distributed over the segment 1A in an irregular manner.

FIGS. 4A to 4E show section views along the section plane IV of FIG. 3B, in the scenario where the segment 1A is a segment 1A with an irregular reinforcement in accordance with the invention. FIGS. 4B to 4E have alternative embodiments to the embodiment of FIG. 4A, and the features shared with those of the embodiment of FIG. 4A will not be described.

More specifically, FIG. 4A shows a section of a transverse contour 30 of the segment 1A having a substantially cylindrical structure. The transverse contour 30 for example has a bubble or bulb shape, i.e. forming a closed contour surrounding a volume V.

The first element 101 and the second element 102 are shown at a distance from the contour 30, to improve the legibility of the figure, at positions facing the contact positions with the segment 1A in the assembled configuration.

The segment 1A comprises a first transverse contour part 10, formed in the transverse contour 30 of the segment 1A. The first contour part 10 has an extension along the main direction X along all or part of the extension of the segment 1A along the main direction X. The first contour part 10 forms an angular sector of the transverse contour 30, extending in an arc over an angle θ1 between 200° and 340°, preferably an angle between 230° and 250°, preferably 240°. The angle θ1 is the central angle intercepting the arc formed between two ends of the first contour part 10, the center being the center of the section of the transverse contour under consideration of the segment 1A.

The arc can also be formed over a length between 55% and 95%, preferably 65% and 70%, preferably 67% of the length of the transverse contour of the seal 1.

The first contour part 10 comprises a first reinforcement part 11. The first reinforcement part 11 comprises reinforcements 5 extending between two ends of the first reinforcement part 11.

The first contour part 10 is intended to be in contact with the first element 101 in the assembled configuration.

The segment 1A also comprises a second transverse contour part 20, formed in the transverse contour 30 of the segment 1A. The second contour part 20 has an extension along the main direction X along all or part of the extension of the segment 1A along the main direction X. The second contour part 20 is intended to be in contact with the second element 102.

The first reinforcement part 11 is absent from the second contour part 20. Thus, the second contour part 20 has a greater susceptibility to buckling than the first contour part 10. Hence, in the scenario where the stresses in the seal are such that the seal has a buckling risk, this would be controlled, i.e. limited to the buckling of the second contour part 20.

The segment 1A has an inner surface Si, corresponding to a radially inward surface surrounding a volume V of a hollow core, and an outer surface Se, corresponding to a radially outward surface Se, comprising the contact surfaces with the first element 101 and the second element 102.

The segment 1A has a measured thickness between the inner surface Si and the outer surface Se. For example, the first contour part 10 can have a thickness greater than the thickness of the second contour part 20.

As shown in FIG. 5B, showing an alternative to the view of FIG. 5A in the scenario where the seal has controlled buckling. The extension of the buckling area is reduced, so that contact is maintained and does not have any discontinuity along the main direction X.

The reinforcements 5 thus ensure the mechanical reinforcement of walls of the seal 1, particularly due to their stiffness. The reinforcements 5 comprise a material which can keep its stiffness at low temperature and at high temperature (in the presence of flames), such that the reinforcements 5 can also fulfil a thermal resistance function, ensuring fire and fluid tightness and forming a barrier to a flame.

In the embodiment of FIG. 5B, the segment 1A has a second contour part 20.

In the same way as the first contour part 10, the second contour part 20 forms an angular sector of the transverse contour 30, extending along an arc formed over an angle θ2.

In this embodiment, the angle θ2 is equal to 360°−θ1, such that the first contour part 10 and the second contour part 20 are separate and their meeting forms the transverse contour of the segment 1A. It will be understood that the angle θ2 can be greater than 360°−θ1, such that the first contour part 10 and the second contour part have common parts, or less than 360°−θ1, such that the segment 1A has other contour parts.

The second contour part 20 comprises a second reinforcement part 21 equipped with reinforcements, which also extends over the first contour part 10.

In this embodiment, the reinforcements 5 of the second reinforcement part 21 are circumferential. It will however be understood that the second reinforcement part 21 can have another extension. For example, the second reinforcement part 21 can be formed solely over a surface in communication with a fire compartment of the propulsion assembly.

Thus, as shown in FIGS. 4A and 4B, the transverse contour 30 may comprise a first reinforcement part 11 and/or a second reinforcement part 12.

In the embodiment of FIG. 4C and of FIG. 4E, the segment 1A has a shoe 12. As shown in FIG. 4C, viewed in a transverse plane, the segment 1A comprises a transverse contour 30 comprising reinforcements 5 and a shoe 12 devoid of reinforcement 5.

The shoe 12 can extend from the transverse contour. The shoe 12 can for example be formed as a single part, or of two ends or more extending form the transverse contour 30, symmetrically or not.

In this case, the shoe 12 is located on the side of the first contour part 10. In other words, viewed in a transverse plane, for example the plane of FIG. 4C or the plane of FIG. 4E, the shoe 12 is closer to the first contour 10 than to the second contour part 20.

The shoe 12 can also be opposite the second contour part 20. In other words, viewed in a transverse plane, for example the plane of FIG. 4C or the plane of FIG. 4E, the shoe 12 is opposite the second contour part 20, in particular diametrically opposite.

In other words, the shoe 12 can be provided opposite a transverse contour part 30 having increased susceptibility to buckling.

The shoe 12 can be provided adjacent to the first contour part 10 having better resistance to buckling than the second contour part 20. In other words, the shoe 12 can be provided adjacent to a transverse contour part 30 having reduced susceptibility to buckling.

The shoe 12 is provided to be received in the first element 101, such that the first element 101 and the segment 1A are secured to one another.

Such a structure ensures the positioning of the seal between the first element 101 and the second element 102 in the assembled position, and thus ensures the control of the buckling and the sealing.

In particular, as shown on FIGS. 4C and 4E, the shoe 12 is provided in the first element 101, the shoe 12 being adjacent to the first contour part 10 and diametrically opposite the second contour part 20, and the second contour part 20 being provided to be in contact with the second element 102. Such a structure makes it possible to further improve the positioning of the seal between the first element 101 and the second element 102, while controlling the buckling of the second contour part such as to ensure a contact maintaining the tightness of the seal.

In the embodiment of FIGS. 4C and 4D, the second contour part 20 has a different curvature to the first contour part 10, for example in the form of a flat area. This different curvature can be present at the level of a contact with the second element 102, particularly in order to adapt the area of contact 122 between the seal and the second element 102 in the assembled configuration.

It will be understood that the individual features described in relation to FIGS. 4A to 4E are mutually compatible. In particular, it will be understood that the seal can have any combination of the features described in relation to FIGS. 4A to 4E.

The first contour part 10 and the second contour part 20 may comprise silicone, into which reinforcements 5 made of glass fiber, carbon figure or aramid fibers are introduced.

Such a combination of materials makes it possible to jointly ensure the fire and fluid tightness discussed previously and the mechanical reinforcement of the seal 1, at low and high temperatures.

As shown in FIGS. 4A to 4E, the reinforcements 5 of the first reinforcement part 11 have a curvature substantially identical to the curvature of the transverse contour part 30 into which the reinforcements 5 are inserted, preferably locally identical.

As shown in FIGS. 4A to 4E, the reinforcements 5 of the second reinforcement part 21 have a curvature substantially identical to the curvature of the transverse contour part 30 into which the reinforcements 5 are inserted, preferably locally identical.

For example, of the transverse contour part 30 is circular, the reinforcements 5 are also circular. This common curvature makes it possible to fulfil the function of mechanical retainment of the reinforcements 5 along the transverse contour part 30 comprising the reinforcements 5.

The reinforcements 5 are shown continuously. It will however be understood that the reinforcements 5 can have discontinuities.

For example, in the embodiment of FIG. 4C and FIG. 4E comprising a shoe 12, the reinforcements 5 can have a discontinuity at the shoe 12, which corresponds to positions at which a reinforcement for mechanical and/or sealing reasons is less useful due to the connection to the first element 101.

In the embodiments of FIGS. 4A to 4E, the first contour part 10 and the second contour part 20 have common contour parts, and the second contour part 20 is shown over the whole contour.

It will however be understood that the first contour part 10 and the second contour part 20 can have various extensions, over all or part of the contour 30.

In the embodiments of FIGS. 4A to 4E, the seal has a substantially circular structure. It will however be understood that the seal can have other shapes, for example elliptical, adapted to the surfaces of the first element 101 and of the second element 102. The curvature of the transverse contour 30 of the seal can be continuous, for example circular or elliptical, or be discontinuous. The transverse contour 30 can also be formed by the meeting of contact parts forming sectors of various curvatures, for example circular, elliptical, or straight (flat) sectors.

The segment 1A can extend over all or part of the length of the seal 1. For example, the segment 1A can extend over a maximum of 20% of the length of the seal, in one or more segments. The segment 1A can for example be provided at positions of the seal at which a buckling risk is identified.

The invention claimed is:

1. A seal configured to be interposed between a first and a second element of a propulsion assembly in an assembled configuration; the seal having an irregularly-reinforced segment extending over at least a part of a length of the seal and which has a transverse contour comprising a first contour part provided with a first reinforcement part, and a second contour part in which said first reinforcement part is absent, such that the second contour part has an increased susceptibility to buckling by comparison with the first contour part;

wherein the seal has a connecting shoe located on a side of the first contour part;

wherein the shoe is devoid of reinforcement; and wherein the shoe is adjacent to the first contour part and diametrically opposite the second contour part.

2. The seal as claimed in claim 1, wherein the first contour part extends in an arc over an angle between 200° and 340°.

3. The seal as claimed in claim 1, comprising a second reinforcement part formed on the first contour part and the second contour part.

4. The seal as claimed in claim 3, wherein the second reinforcement part is formed between the first reinforcement part and an outer surface of the seal.

5. The seal as claimed in claim 3, wherein at least one from among the first reinforcement part and the second reinforcement part comprises at least one layer of reinforcement material housed in a matrix.

6. The seal as claimed in claim 5, wherein the at least one from among the first reinforcement part and the second reinforcement part comprises at least two reinforcement layers formed in superimposed layers.

7. The seal as claimed in claim 1, wherein the first contour part and the second contour part have different curvatures, the second contour part optionally having a flat area.

8. A propulsion assembly comprising a first propulsive assembly element and a second propulsive assembly element and a seal as claimed in claim 1.

9. The propulsion assembly as claimed in claim 8, wherein the irregularly-reinforced segment extends at most over 20% of the length of the seal.

10. The seal as claimed in claim 1, wherein the first contour part extends in an arc over an angle between 230° and 250°.

11. The propulsion assembly as claimed in claim 8, wherein the irregularly-reinforced segment extends at most over 20% of the length of the seal in a single segment.

* * * * *